United States Patent [19]

Forbes et al.

[11] Patent Number: 5,708,477
[45] Date of Patent: Jan. 13, 1998

[54] VIDEO SIGNAL IDENTIFIER FOR CONTROLLING A VCR AND TELEVISION BASED ON THE OCCURRENCE OF COMMERCIALS

[76] Inventors: Scott Jared Forbes, 3254 W. Green Ridge Dr., Tucson, Ariz. 85741; Fred Franklin Forbes, 3263 E. Broadway, Tucson, Ariz. 85716

[21] Appl. No.: 657,026

[22] Filed: May 29, 1996

Related U.S. Application Data

[63] Continuation-in-part of Ser. No. 347,908, Dec. 1, 1994, abandoned.

[51] Int. Cl.[6] .............................. H04N 7/00; H04N 11/00; H04N 5/44
[52] U.S. Cl. ..................... 348/552; 348/553; 348/907; 358/908
[58] Field of Search ............................ 358/908; 348/180, 348/552, 553, 714–719, 907; 386/33, 35, 109; 360/69, 71; 369/19, 20; H04N 7/00, 11/00, 5/44

[56] References Cited

U.S. PATENT DOCUMENTS

| | | | |
|---|---|---|---|
| 3,919,479 | 11/1975 | Moon et al. | 395/2.46 |
| 4,602,297 | 7/1986 | Reese | 358/908 X |
| 4,750,213 | 6/1988 | Novak | 358/908 X |
| 4,752,834 | 6/1988 | Koombes | 360/69 |
| 4,768,229 | 8/1988 | Benjamin et al. | 358/908 X |
| 4,782,401 | 11/1988 | Faerber et al. | 380/20 |
| 4,930,158 | 5/1990 | Vogel | 358/908 X |
| 4,979,047 | 12/1990 | Wine | 358/908 X |
| 5,151,788 | 9/1992 | Blum | 358/908 X |
| 5,253,061 | 10/1993 | Takahama et al. | 348/907 X |
| 5,343,251 | 8/1994 | Nafeh | 348/907 X |
| 5,436,653 | 7/1995 | Ellis et al. | 348/907 X |

FOREIGN PATENT DOCUMENTS 4-329039  11/1992  Japan .................. H04H 9/00

*Primary Examiner*—John K. Peng
*Assistant Examiner*—John W. Miller
*Attorney, Agent, or Firm*—Graham & James LLP

[57] ABSTRACT

A video signal identifier ("VSI") electrically coupled to both a VCR and a television to control their operation. The VSI memorizes commercials then automatically controls the television and video cassette recorder upon identifying a re-occurrence of the commercial. The VSI automatically mutes then restores volume on a television or pauses then resumes VCR recording at the beginning and end of a commercial.

20 Claims, 4 Drawing Sheets

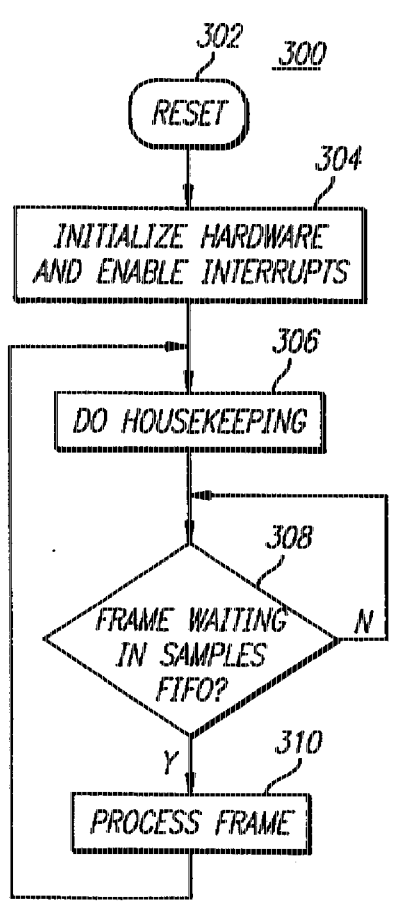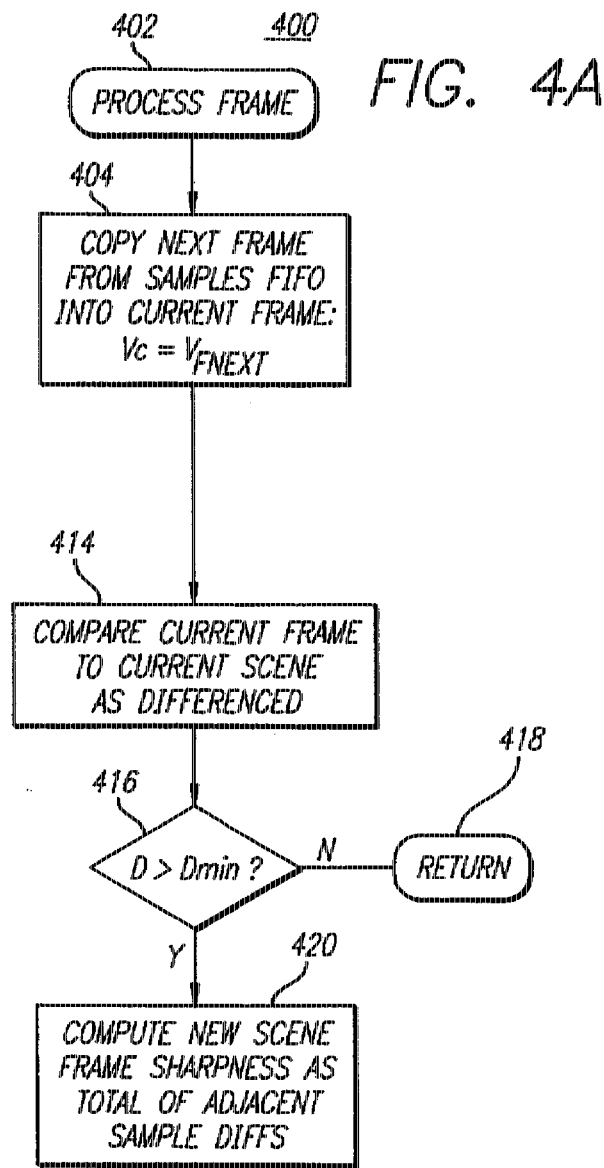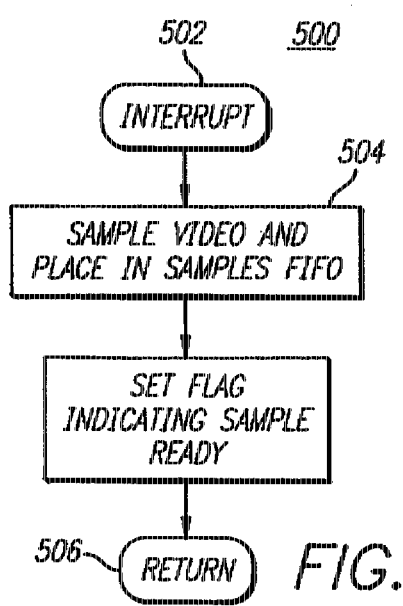
FIG. 3
FIG. 4A
FIG. 5

VIDEO SIGNAL IDENTIFIER FOR CONTROLLING A VCR AND TELEVISION BASED ON THE OCCURRENCE OF COMMERCIALS

RELATED APPLICATIONS

The instant application is a continuation-in-part of application Ser. No. 08/347,908, filed Dec. 1, 1994, now abandoned.

FIELD OF THE INVENTION

The present invention relates to the field of audio-visual appliances. More specifically, the invention details a method and an apparatus for digitally memorizing repetitive television signals for later use in automatically controlling electronic components. In particular, a video signal identifier ("VSI") detects the beginning and end of a television commercial and automatically mutes then restores the audio output of a television, or pauses then resumes video recording by a video cassette recorder.

BACKGROUND OF THE INVENTION

A television receives signals broadcast from a television station via cable, antenna or satellite system and converts the electric signals into the visual images and associated audio produced by the television. A video cassette recorder may be used to record the same signals provided to the television on a magnetic media which can subsequently be transmitted to the television.

Commercial television broadcasts over 2300 commercial messages per day. Television viewers often do not want to hear or see the commercials, particularly when they are recording programs on video cassette recorders. Generally, the commercials have a duration of fifteen, thirty or sixty seconds. Thus, nearly one-third of a daytime television hour is dedicated to commercials.

Presently, television viewers have few options to eliminate television commercials. Viewers can physically mute or change the channel on the television either manually or by using a remote control. However, during unattended preset video cassette recording of a program, the recorder presently cannot avoid recording the commercials. Accordingly, an apparatus which provides automatic preprogrammed commercial detection and elimination would be beneficial.

BRIEF DESCRIPTION OF THE PRESENT INVENTION

The present invention details a self-contained video signal identifier ("VSI") which stores and automatically detects memorized video signals then subsequently mutes, scans or channel switches a television or pauses and resumes video cassette recording. The VSI uses as an input the signals provided to a television, and is electrically coupled to both a VCR and a television to control their operation. The VSI digitally memorizes commercials then automatically controls the television and video cassette recorder upon identifying a re-occurrence of the commercial. The VSI will automatically mute then return volume of a television or pause then resume VCR recording at the beginning and end of a commercial.

BRIEF DESCRIPTION OF THE DRAWINGS

FIGS. 3-5 illustrate the operation of exemplary program code for controlling various operations of the present invention.

DETAILED DESCRIPTION OF THE PREFERRED EMBODIMENT

Figure 1:
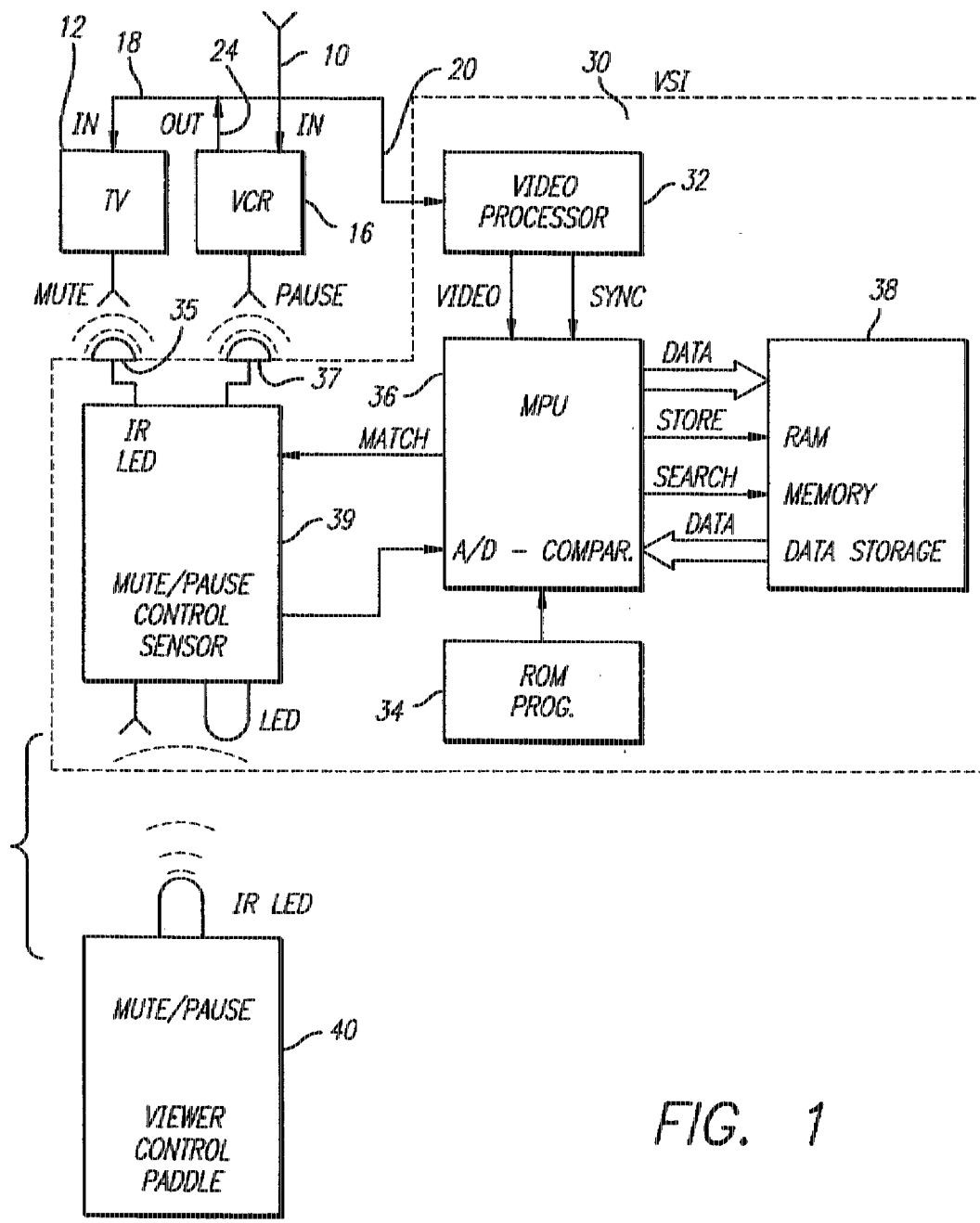
FIG. 1 schematically depicts an audio visual system including a video signal identifier according to the present invention.

FIG. 1 schematically depicts a home audio visual system including an input coaxial cable 10 attached to a television ("TV") 12 and a video cassette recorder ("VCR") 16. The system also includes a coaxial video cable 18 extending from the television 12 through a T connector 24 to a video signal identifier ("VSI") 30. The circuitry of the VSI 30 includes video processor 32, ROM program memory 34, microprocessor unit ("MPU") 36, RAM data storage memory 38, and an infrared mute/pause sensor controller 39.

The purpose of the VSI 30 is to recognize previously identified commercial material and to reject it either by muting the television sound and/or pausing the VCR 16 when it is in record mode. The video processor 32 receives an incoming composite video signal via the video cable 18 and separates the received signal into video and sync signals. A known, the incoming composite video signal comprises a series of video frames. For each video frame in the composite video signal, the MPU 36 creates an abbreviated frame utilizing the video and sync signals. Each such abbreviated frame comprises a plurality of digital values representing the average intensities of the pixels in a particular portion of the video frame. Both hardware and software methods for creating a digitized abbreviated frame from a full analog video frame are well known to persons skilled in the art, and any such method may be used with the present invention.

An example of a suitable hardware method for creating an abbreviated frame utilizes a low pass filter (not shown) and an analog-to-digital converter (not shown) to create an abbreviated frame. The low pass filter filters the sync and video signals received from the video processor 32, and thereby averages the intensity (i.e., brightness) of pixels in a given number of lines in the video frame. The actual number of lines averaged by the low pass filter depends on the cut off frequency of the low pass filter. The output of the low pass filter is then digitized using the analog to digital converter, and the resulting digitized values comprise the abbreviated frame. As will be explained in more detail below, the digital values comprising the abbreviated frame are preferably stored as an array.

After an abbreviated frame is created, an interrupt is generated to signal the MPU 36 that a newly created abbreviated frame is ready to be processed. The frame processing functions performed by the MPU 36 are preferably controlled by program code (i.e., software or firmware) stored in the ROM 34. As will be explained in more detail below, the abbreviated frame that is currently being processed is stored in a memory location designated for the current frame (not shown). As will also be explained in more detail below, the current frame is compared to an abbreviated frame stored in a memory location designated as the current scene (not shown). The current scene location holds an abbreviated frame representing the first frame in the scene currently being received by the video processor 32. As known, a scene in the composite video signal comprises a series of sequential frames that have similar characteristics.

If it is determined that the current frame is sufficiently different from the current scene, the current frame is deemed to represent the beginning of a new scene, and the current frame becomes the new current scene. If on the other hand, the current frame is not sufficiently different from the current scene, the current frame is deemed to be part of the same scene as the current scene, and the current frame is discarded.

Figure 2:
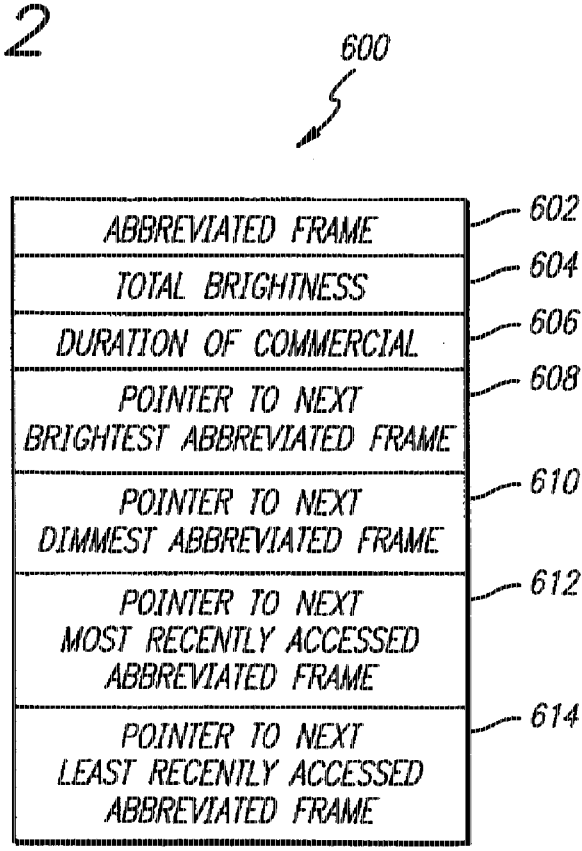
FIG. 2 illustrates an exemplary data structure for storing an abbreviated frame representing a commercial.

When the incoming composite video signal is identified as a commercial, for example by the user, the MPU 36 causes the abbreviated frame stored as the current scene to be copied to the RAM 38 and stored with other abbreviated frames that have previously been identified as representing commercials. The abbreviated frames stored in the RAM 38 (i.e., the "commercial frames") are preferably stored as one or more linked lists. An exemplary data structure 600 for a commercial frame stored in the RAM 36 is illustrated in FIG. 2. The data structure 600 includes the abbreviated frame 602, and may also include the total brightness of the abbreviated frame 604. As described above, the abbreviated frame is preferably an array in which each element of the array represents the average brightness of a portion of the full video frame. The total brightness of an abbreviated frame is therefore simply the sum of the elements of the array. The illustrated data structure 600 also includes a commercial duration entry 606 indicating the total duration of the commercial represented by the abbreviated frame 602.

To facilitate searching operations, the structure 600 also includes a pointer 608 to the next brightest commercial frame and a pointer 610 to the next dimmest commercial frame. These two pointers 608, 610 create a brightness linked list in which the commercial frames stored in the RAM are organized from brightest to dimmest. The structure 600 may also include two addition pointers: a pointer 612 to the next most recently accessed commercial frame, and a pointer 614 to the next least recently accessed commercial frame. These two pointers 612, 614 create a recently accessed linked list in which the commercial frames stored in the RAM 38 are organized from the most recently accessed to the least recently accessed. The recently accessed linked list can be used to support a least-recently-accessed replacement scheme in which an abbreviated frame newly identified as representing a commercial overwrites the least recently accessed commercial frame when the commercial storage space in the RAM 38 is full.

Either a signal sensed by the controller 39 from the viewer's paddle 40 or the match signal from the MPU 36 will activate the controller infrared transmitter which, in turn activates the TV 12 mute or the VCR 16 pause or both. An initial procedure teaches the VSI 30 the specific mute/pause signals which the viewer's control paddle uses. Once this is done, the viewer's TV 12 and VCR 16 cannot distinguish between the viewer's paddle or the controller's infrared transmitter.

The control sensor 39 upon activation transmits a signal from the controller 39 to the MPU 36 instructing it to store the abbreviated frame designating a commercial output from the video processor 32. The MPU 36 transmits the "store" signal to the RAM 38 which then stores the particular abbreviated commercial frame to reference against later.

While the MPU 36 is continuously receiving digitizing input broadcast signals, it continuously scans for broadcast scene changes. After a broadcast scene change occurs, the MPU 36 automatically compares the current abbreviated frame with all of the abbreviated commercial frames stored in RAM 38. When a match is discovered, the MPU 36 provides a "match" signal which is routed to the infrared transmitter in 39 to mute the TV 12 audio and pause the recording on VCR 16. At the end of the commercial selected by the viewer indicating the resumption of desired material, the MPU 36 signals the controller 39 to un-mute (remove the audio mute) and resume recording of VCR 16.

If the viewer's TV 12 or VCR 16 is not equipped with a paddle for control, the audio signals may be switched directly by the VSI 30 by means of a relay (not shown) and input/output connectors (not shown).

To facilitate compatibility with stereo capable televisions, the VSI 30 may be equipped with left and right channel audio inputs (not shown) and left and right channel audio outputs (not shown). The audio inputs and the audio outputs of the VSI 30 would be connectable to a stereo capable television via stereo cables. The VSI 30 receives as an input, broadcast signals from the television 12 via a cable 20. The VSI 30 then routes the input broadcast signals to its video processing elements.

The VSI 30 routes the broadcast signal to the interconnected video processor 32 and then to microprocessor circuit 36. The microprocessor 36 analyzes the broadcast signal for scene changes, and upon detecting a scene change, it signals the control unit 39 to mute and/or pause.

As discussed above, once the abbreviated commercial frame has been stored, the VSI 30 will automatically mute the TV 12 and pause the VCR 16 upon any future occurrence of the commercial identified by an abbreviated commercial frame stored in the RAM 38. Specifically, the microprocessor 36 continuously scans the input broadcast signals for broadcast scene changes. Once a broadcast scene change is detected, the microprocessor 36 directs an abbreviated frame to be stored in the data storage RAM 38. The microprocessor 36 then compares the current and abbreviated frame to all frames which are close to this frame's overall intensity. When a match is discovered, the microprocessor 36 transmits a signal to the controller 39, which turns on the infrared diode muting the TV 12 and sending a pause signal to the VCR 16.

Light emitting diodes ("LED") (not shown) may be provided to indicate what function the VSI 30 is performing. Such LED lights may include a power light (not shown) to indicate when the VSI 30 is turned on, and a mute light (not shown) to indicate when the VSI 30 has muted the TV 12. The VSI 30 may also include additional LED lights (not shown) for use with optional functions of the VSI 30.

The typical mode of operation is where the viewer presses the remote paddle mute button thereby silencing the television commercial for a period of time determined by the viewer who then presses the mute button again to resume the desired program audio. For each subsequent occurrence of the same commercial, the VSI 16 will automatically mute the television and automatically restore the audio at the completion of the commercial. The VSI 16 stores hundreds of commercials in its memory for latter identification and muting purposes.

By entering codes into the VSI 16, the user may control the material viewed. The VSI 16 may also be programmed to reject material not suitable for immature viewers by automatically muting entire programs preselected by the intervention of parental discretion. The option here is to mute or mute and change channels or to completely shut down the television set placing it in a locked mode until an authorized individual unlocks the set for further viewing. Two levels of mute control may exist in the stored VSI 16 program: first, the usual audio mute control executed by the viewer and second, a priority control which is under the control of a mature viewer and secure from immature access.

The universal remote paddle, can be used to program the VSI 16 to mute only, mute and switch to "AV" (blue screen), change to a preselected channel or shut down. It is also possible to have the set programmed to be mute until a preselected program is detected and un-muted.

VCR 16 recording operates much like a mute in that when a commercial is detected, the VCR 16 is placed in "pause" until the mute button is pressed again. Audio is silenced during the pause interval and the VCR tape does not advance so no gap in recording is left on the tape.

The VSI 16 is not only ideal for direct VCR 16 recording from real-time television but is useful for making clean copies and for editing where undesirable material may be easily deleted using the VSI 16 pause control.

Exemplary program code for controlling the MPU will now be described with reference to FIGS. 3, 4a, 4b, and 5. Referring first to FIG. 3, an exemplary embodiment of a main routine 300 is illustrated. The main routine 300 first performs initialization at step 304, which may include initializing hardware elements and enabling interrupts. Following initialization, the main routine 300 performs various "housekeeping" functions at step 306. The housekeeping functions may include processing inputs received from the user. For example, input may be received from the user indicating that the current scene is a commercial, in which case the abbreviated frame representing the current scene is written to the RAM 38. As explained above, if the RAM 38 is full, the current scene overwrites the least recently accessed commercial frame in the RAM (steps not shown). The main routine 300 then determines whether there is a new abbreviated frame waiting to be processed at step 308. If so, the main routine processes the new abbreviated frame by executing a process frame routine 400 at step 310. Otherwise, the main routine waits at step 308 for a new abbreviated frame.

Figure 4B:
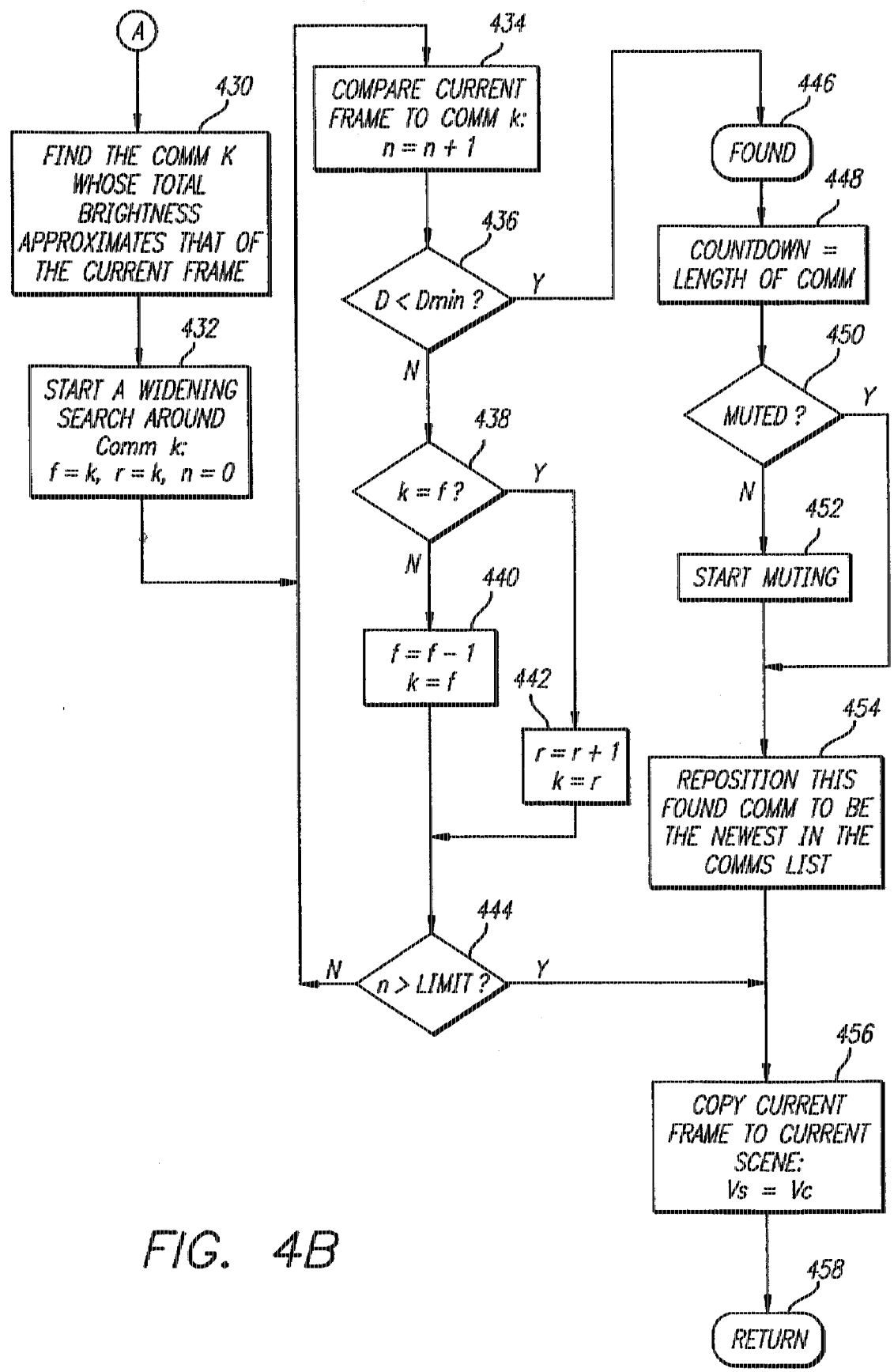

Operation of the process frame routine 400 will now be described with reference to FIGS. 4a and 4b. The process frame routine 400 begins by moving an abbreviated frame from a sample memory (not shown) to the current frame memory location (not shown) at step 404. As will be described below, the sample memory (not shown) temporarily holds abbreviated frames created from the incoming composite video signal that are waiting to be processed. The sample memory may comprise a first-in-first-out (FIFO) buffer. As described above, the current frame memory location (not shown) holds the abbreviated frame that is currently being processed.

The current frame is then compared to the current scene at steps 414–422. As described above, the current scene is an abbreviated frame that represents the first frame in the scene currently being received by the video processor 32. Specifically, a difference value D between the current frame and the current scene is calculated at step 414. An exemplary formula for calculating D is as follows: $D=\Sigma|V_c[i]-V_s[i]|$, in which $V_c[i]$ represents the $i^{th}$ element in the current frame and $V_s[i]$ represents the $i^{th}$ element in the current scene. Once the value D is calculated, D is compared to a minimum difference value $D_{min}$ at step 416. If it is determined at step 416 that D is not greater than $D_{min}$, the current frame represents a video frame that is part of the current scene. Accordingly, the current frame is discarded, and the process frame routine 400 ends at step 418.

If, on the other hand, it is determined at step 416 that D is greater than $D_{min}$, processing continues at step 420, where the sharpness of the current frame is determined. The sharpness of the current frame may be calculated using the following formula: $S=\Sigma|V_c[i-1]-V_c[i]|$. The sharpness S is then compared to a minimum sharpness $S_{min}$ at step 420. If it is determined at step 422 that the sharpness of the current frame S is not greater than the minimum sharpness $S_{min}$, the current frame is discarded, and the process frame routine ends at step 424.

If it is determined at step 422 that the sharpness of the current frame S is greater than the minimum sharpness $S_{min}$, processing continues at step 426, where the total brightness $B_c$ of the current frame is determined. The total brightness $B_c$ of the current frame may be calculated using the following formula: $B_c=\Sigma V_c[i]$. Then, the process frame routine 400 finds a commercial frame stored in the RAM 38 that has a total brightness that is approximately equal to the total brightness $B_c$ of the current frame at step 430. This may be accomplished by utilizing the first few most significant bits (MSBs) of the total brightness $B_c$ of the current frame as an index into the brightness linked list of commercial frames stored in the RAM 38, and then moving through the brightness linked list in a forward and/or reverse direction until a stored commercial frame is found whose total brightness differs from the total brightness of the current frame $B_c$ by less than a predetermined amount $B_{min}$.

Then, beginning at the stored commercial frame whose total brightness approximates that of the current frame $B_c$, the process frame routine 400 traverses the brightness linked list looking for a commercial frame that matches the current frame. An exemplary searching algorithm is illustrated at steps 432–444. Specifically, a forward pointer f and a reverse pointer r are both set equal to the current location k in the brightness linked list. Initially, the current location k is equal to the location k in the brightness linked list of the commercial frame found at step 430. Then, a difference D between the current frame and the commercial frame located at the current location k in the brightness linked list is determined at step 434. The difference D may be calculated as follows: $D=\Sigma|V_c[i]-V_k[i]|$, where $V_c[i]$ represents the $i^{th}$ element in the current frame and $V_k[i]$ represents the $i^{th}$ element in the commercial frame located at the current location k of the brightness linked list of commercial frames. The process frame routine 400 then determines whether the difference value D is sufficiently small to declare a match between the current frame and the commercial frame located at the current location k in the brightness linked list at step 436. If not, the search for a matching commercial frame continues in a forward and/or reverse direction through the brightness linked list of commercial frames until either a match is found at step 436 or a counter "n" exceeds a predetermined limit at step 444.

By indexing into a linked list order by total brightness and then performing a local search in the area of the list for a matching commercial frame as described above, the search time is greatly reduced thereby making implementation of the above described system practical.

If a matching commercial frame is not found before the counter n exceeds the predetermined limit at step 444, the current frame is not a commercial, and the current frame is made the current scene at step 456. The process frame routine 400 then ends at step 458. If, on the other hand, a matching commercial frame is found at step 436, a commercial countdown counter is set equal to the duration of the commercial represented by the matching commercial frame at step 448, and the controller 39 is commanded to send a "mute" signal to the television 12 at step 452. The television remains muted for the duration of the commercial, that is, until the countdown counter has counted down to zero at which time the controller 39 sends an "unmute" signal to the television (steps not shown). Alternatively, the controller 39 can be commanded to send other types of commands to either the television 12 and/or the VCR 16 at step 452. For example, a "pause" command could be sent to the VCR 16 interrupting a recording operation being performed by the VCR. The matching commercial frame is then moved at step 454 to the top of the recently accessed linked list of commercial frames stored in the RAM 38 indicating that the matching commercial frame is the most recently accessed commercial frame. The process frame routine 400 then makes the current frame the current scene at step 456 and ends at step 458.

FIG. 5 illustrates operation of an interrupt routine 500. As described above, an interrupt is generated when a new abbreviated frame is created from the incoming composite video signal. When an interrupt occurs, processing of the main routine 300 or the process frame routine 400 is halted, and the interrupt routine 500 is executed. As illustrated in FIG. 5, the interrupt routine 500 causes the newly created abbreviated frame to be stored in the sample buffer (not shown) at step 504. Once execution of the interrupt routine 500 is completed, processing returns to the point in the main routine 300 or the process frame routine 400 at which processing was halted by the interrupt.

Figure 6:
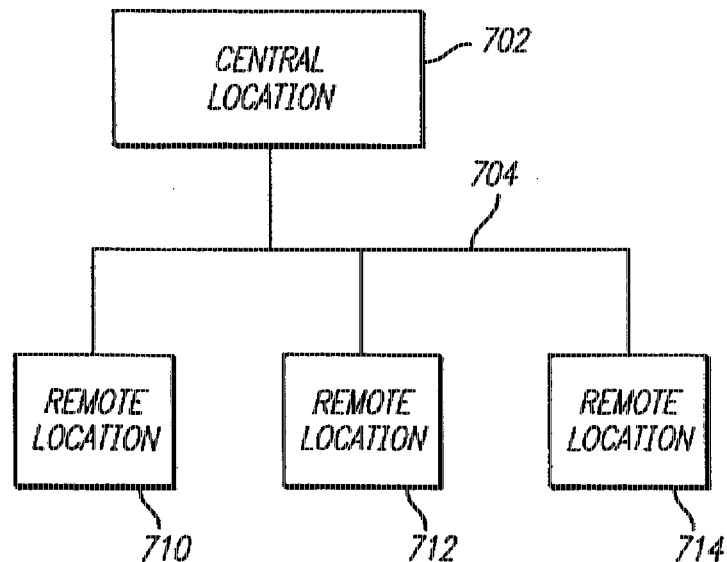
FIG. 6 illustrates an alternative embodiment of the present invention.

An alternative embodiment of the present invention is illustrated in FIG. 6. In such an embodiment, the function of identifying a commercial in a composite video signal is performed at a central location 702, and when a commercial is identified in the composite video signal, commands for controlling a television and/or a VCR are sent from the central location 702 to one or more remote locations 710, 712, 714.

For example, a television broadcast may be received at the central location 702 and at one or more remote locations 710, 712, 714. The broadcast received at the remote locations 710, 712, 714 is displayed on televisions and/or recorded on VCRs located at the remote locations. At the central location 702, abbreviated frames are created from the television broadcast and compared to stored abbreviated frames representing commercials utilizing circuitry and software similar to that described above in connection with FIGS. 1–6. When a match is found, control signals for muting the televisions and/or pausing the VCRs are sent from the central location 702 to the remote locations 710, 712, 714 via a communication media 704. Likewise, when it is determined at the central location 702 that the identified commercial is finished, control signals for unmuting the television and/or resuming operation of the VCR are sent to the remote locations 710, 712, 714. The communication media may comprise any media suitable for communicating control signals over a long distance, including cables, telephone lines, fiber optic cables, and electromagnetic transmissions through air.

In the embodiment illustrated in FIG. 6, most of the circuitry and software illustrated in FIGS. 1–6 would be located at the central location 702. The circuitry and software located at the central location 702 could additionally include the ability to tailor the signals sent to each remote location 710, 712, 714 so that control signals are sent to a particular remote location only during certain time periods and/or only for television signals broadcast at specified frequencies.

It should be evident from the foregoing description that the present invention provides a useful addition to home entertainment systems. It will be understood that the embodiments described herein are merely exemplary and that a person skilled in the art may make many variations and modifications without departing from the spirit and scope of the invention.

For example, although in the exemplary embodiment described above the intensity of pixels in a video frame is the characteristic used to create abbreviated frames, other characteristics of a video frame could alternatively be used, including the color or luminance of pixels in the frame. Likewise, features of the audio signal accompanying the video frame could alternatively be used to create an abbreviated frame. In addition, although the preferred embodiment of the invention has been described as utilizing hardware to create abbreviated frames and software to process the abbreviated frames, software could alternatively be used to create abbreviated frames and/or hardware could be used to process the abbreviated frames. Also, the function of determining whether the current frame is part of the current scene has been described above as utilizing both a difference value D (steps 414, 416) and a sharpness value S (steps 420, 422). However, such a function could alternatively be accomplished by utilizing only the difference value D (steps 414, 416) or only the sharpness value S (steps 420, 422). In addition, although the above described embodiments of the present invention operate on commercials in the received broadcast signal, the present invention could alternatively operate on any uniquely identifiable segment of the broadcast signal. Also, although the alternative embodiment illustrated in FIG. 6 was described as operating on a television broadcast, such an embodiment could also operate on other types of broadcasts of video signals, including broadcasts over cable media and satellite broadcasts.

All such modifications are intended to be included within the scope of the invention as defined in the appended claims.

What is claimed is:

1. A method of controlling electronic equipment comprising:

receiving an electrical signal comprising video frames;

creating a current abbreviated frame corresponding to one of said video frames of said electrical signal;

determining a total value of a particular characteristic of said current abbreviated frame;

finding one of a plurality of abbreviated frames previously identified as representing a program segment and stored in a memory, said found abbreviated frame having a total value of a particular characteristic that differs from said total value of said particular characteristic of said current abbreviated frame by less than a predetermined total characteristic threshold;

beginning at said found abbreviated frame, searching said memory for a stored abbreviated frame that matches said current abbreviated frame within a predetermined match threshold; and sending at least one control signal to said electronic equipment to interrupt an operation being performed by said electronic equipment if said searching means finds a matching stored abbreviated frame.

2. The method of claim 1 further comprising:

setting a timer equal to a duration of the program segment represented by said stored abbreviated frame found at said searching step; and sending at least one control signal to said electronic equipment to resume said interrupted operation when said timer expires.

3. An apparatus for controlling electronic equipment comprising:
   memory means for storing a plurality of abbreviated frames each representing a particular program segment;
   means for receiving an electrical signal comprising a sequence of video frames;
   means for creating a current abbreviated frame corresponding to one of said video frames composing said electrical signal;
   means for determining a total value of a particular characteristic of said current abbreviated frame;
   means for finding one of said plurality of abbreviated frames stored in said memory means whose total value of said particular characteristic differs from said total value of said particular characteristic of said current abbreviated frame by less than a predetermined total characteristic threshold;
   means for searching, beginning at said abbreviated frame found by said finding means, said memory means for an abbreviated frame that matches said current abbreviated frame within a predetermined match threshold; and
   means for sending at least one control signal to said electronic equipment to interrupt an operation being performed by said electronic equipment if said searching means finds a matching abbreviated frame.

4. The apparatus of claim 3 further comprising:
   means for determining whether said current abbreviated frame represents a scene change in said received electrical signal; and
   means for discarding said current abbreviated frame if said current abbreviated frame does not represent a scene change.

5. The apparatus of claim 4, wherein said means for determining whether said current abbreviated frame represents a scene change comprises:
   means for comparing said current abbreviated frame to an abbreviated frame representing a current scene of said received electrical signal; and
   means for comparing a total sharpness of said current abbreviated frame to a minimum total sharpness threshold value.

6. The apparatus of claim 3, wherein said plurality of abbreviated frames are stored in said memory means as a linked list.

7. The apparatus of claim 6, wherein said plurality of abbreviated frames are arranged in said linked list in an order corresponding to an increasing amount of said total value of said particular characteristic for each of said abbreviated frames.

8. The apparatus of claim 7 wherein said searching means comprises means for traversing said linked list in an order of increasing values of said particular characteristic.

9. The apparatus of claim 7 wherein said searching means comprises means for traversing said linked list in an order of decreasing values of said particular characteristic.

10. The apparatus of claim 3, wherein said finding means comprises means for comparing a portion of said determined total value of said particular characteristic of said current abbreviated frame with one or more of said plurality of abbreviated frames stored in said memory means.

11. The apparatus of claim 3, wherein said electronic equipment includes a television, and said control signals include signals for muting an audio output of said television.

12. The apparatus of claim 3, wherein said electronic equipment includes a video cassette recorder, and said control signals include signals for stopping a recording operation being performed by said video cassette recorder.

13. The apparatus of claim 3, wherein said particular characteristic comprises brightness.

14. The apparatus of claim 3, wherein an abbreviated frame comprises a plurality of data values, each said data value representing a value of said particular characteristic over a portion of said video frame corresponding to said abbreviated frame.

15. The apparatus of claim 14, wherein said searching means comprises means for comparing each of said plurality of data values composing said current abbreviated frame with each of said plurality of data values composing one or more of said abbreviated frames stored in said memory means.

16. The apparatus of claim 3 further comprising:
   means for setting a timer equal to a duration of the program segment represented by the stored abbreviated frame found by said searching means; and
   means for sending at least one control signal to said electronic equipment to resume said interrupted operation when said timer expires.

17. The apparatus of claim 3 further comprising means for storing an abbreviated frame representing a current scene in said memory means in response to a control signal.

18. The apparatus of claim 17, wherein said plurality of abbreviated frames are stored in said memory means in an order from most recently accessed to least recently accessed, and said means for storing an abbreviated frame representing a current scene in said memory means includes means for overwriting the least recently accessed abbreviated frame in said memory means when said memory means is full.

19. The apparatus of claim 3, wherein said electronic equipment is located at a location remote from said apparatus for controlling said electronic equipment, and said apparatus for controlling said electronic equipment further comprises communication means for transmitting said at least one control signal to said electronic equipment.

20. An apparatus for controlling electronic equipment comprising:
   memory means for storing a plurality of abbreviated frames representing commercials, said plurality of abbreviated frames being stored as a linked list, said linked list being ordered from an abbreviated frame having a greatest total brightness to an abbreviated frame having a least total brightness;
   means for receiving an electrical signal comprising a sequence of video frames;
   means for creating a current abbreviated frame corresponding to one of said video frames of said electrical signal, said current abbreviated frame comprising a plurality of data values, each said data value representing an average brightness of a portion of the corresponding video frame;
   means for storing a current scene abbreviated frame representing a current scene of said received electrical signal in said memory means in response to a control signal identifying said current scene as a commercial;
   means for determining whether said current abbreviated frame represents a scene change and discarding said current abbreviated frame if said current abbreviated frame does not represent a scene change;
   means for determining a total brightness of said current abbreviated frame;
   means for finding an abbreviated frame stored in said memory means whose total brightness differs from said total brightness of said current abbreviated frame by less than a predetermined brightness threshold;

means for searching said memory means for a stored abbreviated frame that matches said current frame within a predetermined match threshold by beginning said search at said found abbreviated frame and traversing said linked list, said searching means comparing each of said plurality of data values composing said current abbreviated frame with each of said plurality of data values composing abbreviated frames stored in said memory means;

means for sending at least one control signal to said electronic equipment to interrupt an operation being performed by said electronic equipment if said searching means finds a matching abbreviated frame;

means for setting a timer equal to a duration of the commercial represented by the abbreviated frame found by said searching means; and means for sending a control signal to said electronic equipment to resume said interrupted operation when said timer expires.

* * * * *